US009020534B2

(12) United States Patent
Ruuspakka et al.

(10) Patent No.: US 9,020,534 B2
(45) Date of Patent: Apr. 28, 2015

(54) LOCATION-BASED MOBILE DEVICE PROFILE AGGREGATION

(75) Inventors: Roger M. Ruuspakka, San Diego, CA (US); Dimosthenis Kaleas, Carlsbad, CA (US); Richard O. Farley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 12/712,654

(22) Filed: Feb. 25, 2010

(65) Prior Publication Data

US 2011/0207440 A1 Aug. 25, 2011

(51) Int. Cl.
*H04W 24/00* (2009.01)
*G06Q 30/00* (2012.01)
*H04W 4/08* (2009.01)
*G06Q 30/02* (2012.01)
*H04W 8/18* (2009.01)
*H04L 29/08* (2006.01)

(52) U.S. Cl.
CPC ............. *H04W 4/08* (2013.01); *G06Q 30/0269* (2013.01); *G06Q 30/0267* (2013.01); *G06Q 30/0261* (2013.01); *H04W 8/186* (2013.01); *H04L 67/306* (2013.01)

(58) Field of Classification Search
CPC .......... G06Q 30/0261; G06Q 30/0267; G06Q 30/0269
USPC .............. 455/414.1–414.3, 456.1–456.6; 705/14.49, 14.57, 14.58, 14.64, 14.66, 705/26.41; 726/27
See application file for complete search history.

(56) References Cited

U.S. PATENT DOCUMENTS

| | | | | |
|---|---|---|---|---|
| 6,418,415 | B1 * | 7/2002 | Walker et al. | 705/26.2 |
| 7,877,082 | B2 * | 1/2011 | Eagle et al. | 455/414.1 |
| 8,005,489 | B2 * | 8/2011 | Fransioli | 455/456.3 |
| 2004/0023666 | A1 * | 2/2004 | Moon et al. | 455/456.1 |
| 2006/0064346 | A1 | 3/2006 | Steenstra et al. | |
| 2007/0093258 | A1 * | 4/2007 | Steenstra et al. | 455/456.5 |
| 2008/0040226 | A1 * | 2/2008 | Roker | 705/14 |
| 2008/0281854 | A1 | 11/2008 | Abhyanker | |

(Continued)

FOREIGN PATENT DOCUMENTS

| | | |
|---|---|---|
| EP | 2107761 A1 | 10/2009 |
| JP | 2003122994 A | 4/2003 |

(Continued)

OTHER PUBLICATIONS

Cook, William et al., comScore Media Metrix U.S. Methodology, Advertising Research Foundation, Apr. 2009.*
International Search Report and Written Opinion—PCT/US2011/026258—ISA EPO—Aug. 10, 2011.

*Primary Examiner* — Ariel Balaoing
*Assistant Examiner* — Larry Sternbane
(74) *Attorney, Agent, or Firm* — Jeffrey D. Jacobs

(57) ABSTRACT

Systems, methods, devices, and computer program products are described for generating an aggregated group profile of access terminal users in an identified geographic region (e.g., at an entertainment venue). A group profile request may be received for a set of mobile access terminal users in the identified geographic region. User profile information may be requested for each of the users. User profiles may be aggregated to generate an aggregated group profile. The aggregated group profile may be distributed (e.g., for use in selecting advertisements at an entertainment venue to reflect the users currently in attendance).

36 Claims, 8 Drawing Sheets

(56) References Cited

U.S. PATENT DOCUMENTS

2008/0305781 A1* 12/2008 Wilson et al. .............. 455/414.1
2009/0061883 A1   3/2009  Abhyanker
2009/0083367 A1   3/2009  Li
2009/0197616 A1   8/2009  Lewis et al.
2009/0307263 A1  12/2009  Skibiski et al.

FOREIGN PATENT DOCUMENTS

| JP | 2005300965 A | 10/2005 |
|----|--------------|---------|
| JP | 2008181334 A | 8/2008 |
| JP | 2009017013 A | 1/2009 |
| WO | WO2008147252 A1 | 12/2008 |
| WO | 2009099875 A2 | 8/2009 |

* cited by examiner

LOCATION-BASED MOBILE DEVICE PROFILE AGGREGATION

BACKGROUND

Wireless communication systems are widely deployed to provide various communication services such as voice, video, packet data, messaging, broadcast, etc. These wireless systems may be multiple-access systems capable of supporting multiple users in relatively small geographic areas by dividing the available system resources (e.g., time, frequency, and power) among users. As wireless systems have proliferated, a variety of location determination technologies have evolved as well. Most mobile devices manufactured today include components that allow a device's location to be identified.

There are many areas where groups or crowds of people gather (e.g., sports or entertainment venues, high-traffic roads, and public transportation hubs). In many instances, these groups tend to have common interests. However, when advertising or offering other services at a given site, a generic approach is often used. For example, at many venues, service offerings and advertisements are static over time, and are geared to general demographics of attendees that could be at the venue, instead of group demographics of actual attendees at a given point in time. The ability to better tailor service offerings or advertising to the group that has actually gathered at a given time may be of value to the parties involved.

SUMMARY

Systems, methods, devices, and computer program products are described for generating an aggregated group profile of access terminal users in an identified geographic region (e.g., at an entertainment venue). A group profile request may be received for a set of mobile access terminal users in an identified geographic region. User profile information may be requested for each of the users. Received user profiles may be aggregated to generate an aggregated group profile. The aggregated user profiles may be transmitted (e.g., for use in selecting advertisements at an entertainment venue to reflect the users currently in attendance).

An exemplary method of generating an aggregated group profile includes: receiving a group profile request for a plurality of mobile access terminal users in an identified geographic region; transmitting a request for a user profile for each mobile access terminal user; receiving a plurality of the requested user profiles; generating an aggregated group profile using the received plurality of user profiles; and transmitting the aggregated group profile.

Embodiments of such a method may include one or more of the following features: detecting the plurality of mobile access terminal users in the identified geographic region; identifying, within the identified geographic region, mobile access terminal users subscribed to a service with access to respective user profiles for group profile aggregation; looking up address data for access to each of the user profiles of the plurality of mobile access terminal users and transmitting the request for each user profile to respective addresses (which may be storage devices geographically remote from each other); and/or receiving specification data identifying a type of user profile information to be aggregated, wherein the aggregated group profile is generated according to the specification data. In one embodiment, the request for the user profile for each mobile access terminal user is a request for only the type of user profile information to be aggregated, and the receiving user profiles involves receiving only the type of user profile information to be aggregated.

Also or alternatively, embodiments of the method may include one or more of the following features: selecting an advertisement from a plurality of available advertisements responsive to the aggregated group profile; receiving identification of additional mobile access terminal users entering the identified geographic region, transmitting an additional request for user profiles of the additional mobile access terminal users, receiving a plurality of the requested user profiles for the additional mobile access terminal users, and generating an updated aggregated group profile using the received plurality of user profiles; and dynamically changing the selection from a first advertisement of a plurality of available advertisements to a second advertisement of the plurality of available advertisements responsive to an updated aggregated group profile.

Also or alternatively, embodiments of the method may include one or more of the following features: receiving data input by a first mobile access terminal user to generate a user profile for the first mobile access terminal user; and monitoring use of a mobile access terminal by a first mobile access terminal user to generate a user profile for the first mobile access terminal user. In one embodiment, the user profile may include data identifying age, gender, income, residence address, or any combination thereof. In another embodiment, the group profile request and identification of the plurality of mobile access terminal users in the identified geographic region are received from an entertainment venue, and the aggregated group profile is transmitted to the entertainment venue.

An exemplary apparatus for generating an aggregated group profile includes: means for receiving a group profile request for a plurality of mobile access terminal users in an identified geographic region; means for transmitting a request for a user profile for each mobile access terminal user; means for receiving a plurality of the requested user profiles; means for generating an aggregated group profile using the received plurality of user profiles; and means for transmitting the aggregated group profile.

Embodiments of such an apparatus may include one or more of the following features: means for identifying the plurality of mobile access terminal users in the identified geographic region, means for receiving an identification of the plurality of mobile access terminal users in the identified geographic region, or means for selecting an advertisement from a plurality of available advertisements responsive to the aggregated group profile. Also or alternatively, the means for transmitting the request may include means for looking up address data for access to each of the user profiles of the plurality of mobile access terminal users and means for transmitting the request for each user profile to the respective addresses. Some of the respective addresses may reside on a storage access terminal local to the apparatus. Also or alternatively, the means for generating may be the means for generating the aggregated group profile according to specification data identifying a type of user profile information to be aggregated.

An alternative exemplary apparatus for generating an aggregated group profile includes: a network interface configured to receive a group profile request for a plurality of mobile access terminal users each detected in an identified geographic region, and to transmit an aggregated group profile responsive to the group profile request; a profile requester configured to request a user profile for each mobile access terminal user; and an aggregator configured to receive the requested user profiles and generate the aggregated group profile using the received plurality of user profiles.

Embodiments of such an apparatus may include one or more of the following features: the aggregator may be further configured to receive specification data identifying one or more types of user profile information to be aggregated, wherein the aggregated group profile is generated according to the specification data. Also or alternatively, the network interface may be further configured to receive substantially real-time updates on mobile access terminal users entering and leaving the identified geographic region, and the aggregator may be further configured to generate the aggregated group profile using user profiles of mobile access terminal users in the identified geographic region according to the substantially real-time updates.

An exemplary computer program product for generating an aggregated group profile includes instructions to cause a processor to: receive a group profile request for a plurality of mobile access terminal users in an identified geographic region; transmit a request for a user profile for each mobile access terminal user; receive a plurality of the requested user profiles; generate an aggregated group profile using the received plurality of user profiles; and transmit the aggregated group profile.

Embodiments of such a computer program product may include one or more of the following features: instructions configured to cause the processor to identify, within the identified geographic region, mobile access terminal users subscribed to a service with access to respective user profiles for group profile aggregation; instructions to look up address data for access to each of the user profiles of the plurality of mobile access terminal users and transmit the request for each user profile to respective addresses; and instructions to select or recommend an advertisement from a plurality of available advertisements responsive to the aggregated group profile.

An exemplary system for generating an aggregated group profile includes: a location server configured to identify a plurality of mobile access terminal users in an identified geographic region, and a user profile server configured to store user profiles for each of the plurality of mobile access terminal users. The example system further includes a profile aggregation server configured to: receive a group profile request and the identification of the plurality of mobile access terminal users; transmit a request for at least a part of the user profile for each mobile access terminal user to the user profile server; receive a plurality of the requested user profiles; generate an aggregated group profile using the received plurality of user profiles; and transmit the aggregated group profile.

Embodiments of such a system may include one or more of the following features: the location server may be part of a network for an entertainment venue, and may identify the plurality of mobile access terminal users in the identified geographic region when the mobile access terminal users join the network; or, the location server may identify the plurality of mobile access terminal users in the identified geographic region by receiving notification from a location based service provider.

Also or alternatively, the location server may further be configured to monitor mobile access terminal users in the identified geographic region, and transmit periodic updates to the profile aggregation server identifying mobile access terminal users in the identified geographic region. The profile aggregation server may further be configured to generate updated aggregated group profiles using the periodic updates.

Also or alternatively, embodiments of such a system may include one or more of the following features: the user profile server may further be configured to look up locally stored address data for access to each of the user profiles of the plurality of mobile access terminal users, and transmit the requests for each user profile to respective addresses; the user profile server may further be configured to specify, in the requests for each user profile, a type of user profile information to be aggregated, and provide the type of user profile information to be aggregated to the profile aggregation server. Thus, certain user profile information may be withheld from the profile aggregation server. Also or alternatively, the profile aggregation server may be configured to receive specification data identifying a type of user profile information to be aggregated, and the aggregated group profile may be generated according to the specification data. This specification data may, for example, be selected by an entertainment venue, and the profile aggregation server may be configured to transmit the aggregated group profile to the entertainment venue.

BRIEF DESCRIPTION OF THE DRAWINGS

A further understanding of the nature of the following description may be realized by reference to the figures referenced below. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, methods, devices, and computer program products are described for generating an aggregated group profile of mobile access terminal users within a given geographic region (e.g., at an entertainment venue). A request may be received (e.g., from a venue) to generate a group profile for the mobile access terminal users in the identified region. The users within the region may be detected in a number of different ways, and user profile information may be requested for each of the users. Received user profiles may be aggregated to generate an aggregated group profile. The profile may be updated as users enter and leave the region. Aggregated user profiles may be transmitted (e.g., for use in selecting advertisements at an entertainment venue to reflect the users currently in attendance).

The following description provides examples, and is not intended to limit the scope, applicability, or configuration of the claims. Rather, the ensuing discussion will provide those skilled in the art with an enabling description for implementing various embodiments. Changes may be made in the function and arrangement of elements without departing from the spirit and scope of the disclosure. Thus, various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
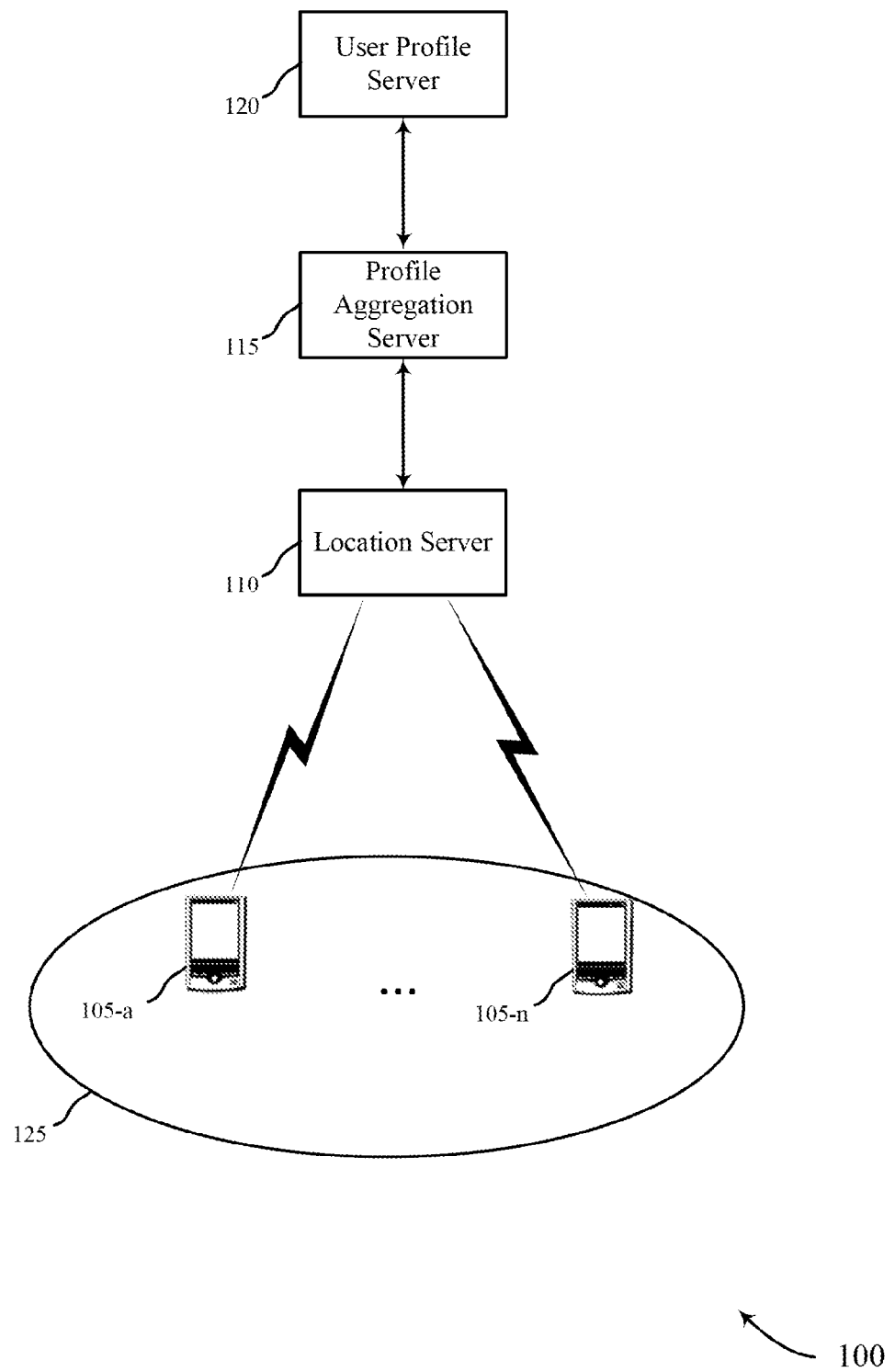
FIG. 1 is a block diagram illustrating a system for group profile aggregation.

Referring first to FIG. 1, a block diagram illustrates a system 100 including a location server 110, a profile aggregation server 115, and a user profile server 120, which may each be in communication with each other. Each server may, for example, be made up one or more server computers, personal computers, workstations, web servers, or other suitable computing devices, and the individual computing device(s) for a given server may be local or remote from each other. The location server 110, profile aggregation server 115, and user profile server 120 may be integrated into a single apparatus.

In some embodiments, the location server 110 is configured to identify mobile access terminals (ATs) 105 in an identified geographic region 125 (e.g., a sports or entertainment venue, a part of a high-traffic road, or a public transportation hub). There are a number of ways in which this identification may take place. For example, the location server 110 may receive an identification of the ATs 105 in the identified geographic region from a location-based service provider. Alternatively, the location server 110 may be a part of a network at a venue, and may detect the presence of a user as they join the venue's network (e.g., WiFi, IEEE 802.15.4/ZigBee, IEEE 802.15.1/Bluetooth, peer-to-peer, ad-hoc) or through other means (barcode scanning, providing a unique identifier, a log on procedure, etc.). In one embodiment, the location server 110 identifies only those ATs 105 that are subscribed to a service allowing access to respective user profiles for group profile aggregation. The location server 110 may monitor ATs 105 as they enter or leave the identified geographic region, and transmit periodic updates.

As noted above, the location server 110 may identify the ATs 105 within an identified geographic region 125. An AT 105 may be a smartphone, a cellular phone, a VoIP phone, a personal digital assistant, a pager, a text messaging device, an email device, a laptop, a portable digital music player, a two way radio, any mobile phone or other mobile device that communicates voice or data, wireless tags (e.g., passive or active RFID tags), magnetic strip media (e.g., loyalty cards) or any combination of the foregoing. The term "VoIP" includes any type of voice service that is provided over a data network, such as an Internet Protocol (IP)-based network. The term VoIP includes any transmission where a voice signal from a phone is converted into a digital signal that travels over a data network. VoIP also includes any system wherein data in a network is delivered to an AT 105 and converted into an audio signal.

A geographic region 125 may be a geographic area with specified boundaries. Also, or alternatively, it may be defined more loosely as an area in which mobile devices receive a signal quality above a given threshold. A geographic region 125 may include altitude limitations as well (e.g., different levels at an arena). A geographic region 125 may be a part of a sports or entertainment venue (e.g., a seating area, a concourse, a concession stand), a part of a high-traffic road, or an area of a public transportation hub. In addition, although it is noted that a user's presence may be detected within a geographic region 125, a user's virtual presence may be detected as well. For example, a user's virtual presence may be detected in an application that involves software interaction (e.g., chat room, social networks, instant messaging). This may include a jabber session, or some virtual world type application whereby users sign on. A group of users' presence may be detected, and their profiles may be aggregated and used as discussed below (e.g., ads may be customized by application, or virtual world environment). Thus, while much of the following discussion refers to location related detection and aggregation, virtual presence may be used to establish groups for profile aggregation as well.

Moreover, a variety of location identification technologies may be used, including satellite location information, cellular location information, network analysis of location information, location information specific to a building, or other means for location determination. The location information may be based on triangulation using cellular towers or access points. The location information may be Global Positioning System (GPS) coordinates, or any other GPS related location information. Cellular carriers may employ a variety of means of locating ATs 105 using cellular towers. By way of example, the time difference of arrival, angle of arrival, and location pattern matching methods are well known in the art as alternative means of obtaining location information. The location information may include altitude information (e.g., to indicate location within a multi-level building or arena). Additionally, any combination of the above may be used.

The location server 110 may transmit data specifying the identified ATs 105 in the geographic region 125 to the profile aggregation server 115. This identification may be in the form of a Media Access Control (MAC) address, or other identifier. The transmission may be done on a periodic basis, updating previous transmissions to reflect the current AT 105 users in the geographic region 125. The profile aggregation server 115 may also receive a group profile request to provide an aggregated profile of the AT 105 users in the geographic region 125. The group profile request may be received from the location server 110, or another source. The group profile request may include specification data identifying the type of user profile information to be aggregated. Thus, the group profile request may specify that only parts of the user profile information available be aggregated.

The profile aggregation server 115 may transmit a request to the user profile server 120, requesting all or part of the user profile for the AT 105 users in the geographic region. The user profile server 120 may look up address data for access to each of the user profiles of the AT 105 users, and transmit the request for each user profile (or parts thereof) to respective addresses. The respective addresses for the user profiles may correspond to storage devices that are local to or remote from the user profile server 120. For example, in one embodiment the user profiles are distributed, located in storage devices geographically remote from each other. In some embodiments, the user profiles are stored in a central location. The user profile information may be stored at the user profile server 120 as well.

Each user profile may be created from information input by an AT 105 user to generate the user's profile. Use of the AT 105 may be monitored to generate the information for or add information to the user profile. A user profile may include data identifying age, gender, income, residence address, work address, occupation, purchase history, interests, musical preferences, entertainment preferences, or any combination thereof. The user profile server 120 may specify the type of user profile information requested. Thus, when less than all of the user profile information will be aggregated, only a portion of the user profile is accessed in some embodiments. In one embodiment, the user profile server 120 specifies, in the requests for each user profile, the type of user profile information to be aggregated, allowing certain user information to be withheld at the source.

The user profile server 120 transmits the requested user profile information to the profile aggregation server 115 for aggregation. The profile aggregation server 115 may generate an aggregated group profile using the received user profile information. The aggregated group profile may be generated according to the specification data from the group profile request identifying a type (or types) of user profile information to be aggregated (e.g., only certain types of information will be aggregated in some embodiments). The aggregated group profile may be updated, e.g., as AT 105 users enter or exit the geographic region.

The profile aggregation server 115 may transmit the aggregated group profile. This aggregated group profile may be transmitted to any number of destinations (e.g., to the requesting venue, to an ad server, etc.). For example, in one embodiment the data specifying the type of user profile information to be aggregated is selected by an entertainment venue that transmits the group profile request to the profile aggregation server 115. The profile aggregation server 115 transmits the aggregated group profile to the entertainment venue. An advertisement may be selected responsive to the aggregated group profile. The selection of advertisements may change responsive to the updated aggregated group profile, e.g., as the mix of AT 105 users at a venue changes.

The location server 110, profile aggregation server 115, and user profile server 120 of the system 100 may be directly connected, or may be connected via a network, which may include both wired and wireless connections, including optical links. The network may be any, or any combination of, the following: the Internet, an IP network, an intranet, a wide-area network ("WAN"), a local-area network ("LAN"), a virtual private network, the Public Switched Telephone Network ("PSTN"), or any other type of network supporting data communication between devices described herein. In the discussion, a network may or may not be noted specifically. If no specific means of connection is noted, the link, communication, or other connection between devices may be via a network.

Figure 2:
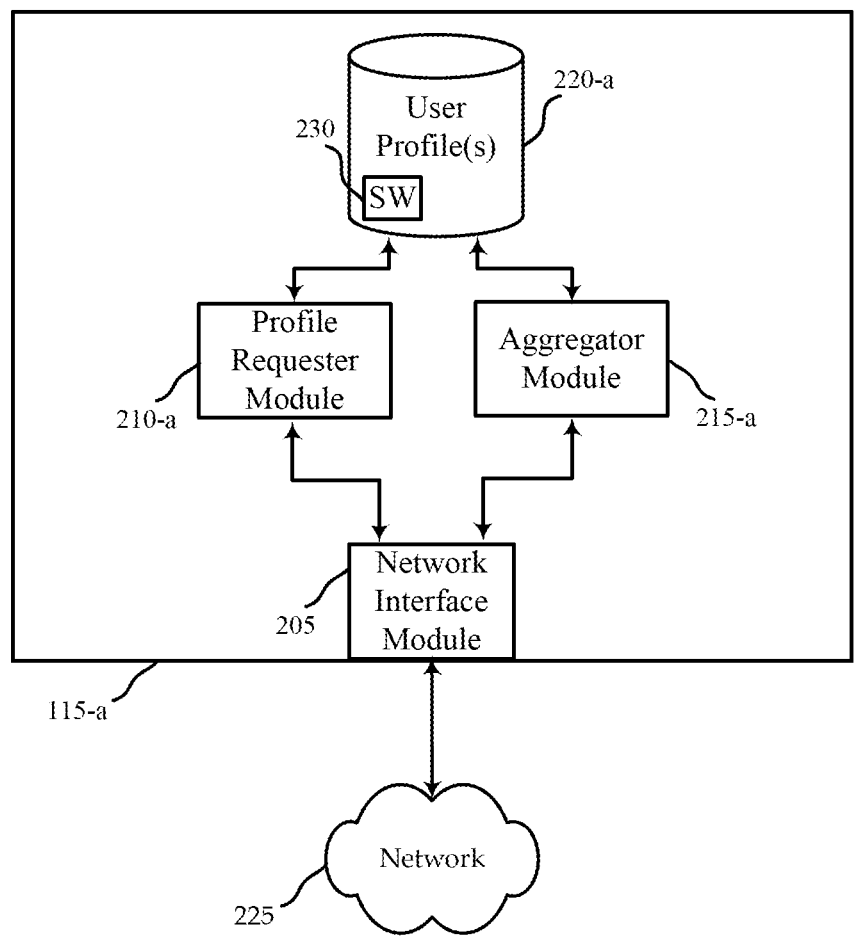
FIG. 2 is block diagram illustrating a profile aggregation server.

Referring next to FIG. 2, a block diagram 200 illustrates an example of a profile aggregation server 115-*a* apparatus. This profile aggregation server 115-*a* may be the profile aggregation server 115 of FIG. 1. The profile aggregation server 115-*a* includes a network interface module 205, a profile requester module 210-*a*, an aggregator module 215-*a*, and user profile(s) 220-*a* memory, each in communication with each other directly or indirectly. The network interface module 205 may include one or more modules for multi-mode communication with various networks 225.

The network interface module 205, profile requester module 210-*a*, and aggregator module 215-*a* may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with software code instructions 230 embodied in a memory, formatted to be executed directly or indirectly (e.g., after compiling) by one or more general or application-specific processors (or in combination with the processor(s)).

Each unit may include memory, or accessed memory may be elsewhere on (e.g., user profile(s) 220-*a* memory) or off the profile aggregation server 115-*a* apparatus.

The network interface module 205 may receive (via the network 225) a group profile request for the AT users (e.g., AT users 105 of FIG. 1) detected in an identified geographic region. The group profile request may include specification data identifying the types of user profile information to be aggregated. The network interface module 205 may also receive data specifying the identified ATs in the geographic region. The group profile request and the data specifying the ATs within the region may be forwarded to the profile requester module 210-*a* and the aggregator module 215-*a*.

The profile requester module 210-*a* may generate data requesting a user profile for each of the AT users. This user profile request data may be forwarded by the network interface module 205 over the network 225 (e.g., to the user profile server 120 of FIG. 1, or to specific network addresses with access to user profile information). The requested user profile information may be received by the network interface module 205, and forwarded on to the aggregator module 215-*a* for local storage in user profile(s) 220-*a* memory. It is worth noting that while in some embodiments the user profiles are retrieved from distributed locations, in other embodiments some of the user profiles may be stored locally (e.g., in user profile(s) 220-*a* memory) on a temporary or more permanent basis.

The aggregator module 215-*a* may generate the aggregated group profile using the received user profiles. The generated aggregate group profile may be standardized, or may be generated according to the specification data in the group profile request to focus on only certain types of user profile information. The generated aggregate group profile may be transmitted using the network interface module 205.

It is worth noting that the network interface module 205 may be configured to receive substantially real-time updates on ATs 105 entering and leaving the identified geographic region. The profile requester module 210-*a* may generate data requesting a user profile associated with each the entering ATs 105. The aggregator module 215-*a* may generate the aggregated group profile using the user profiles of AT 105 users in the identified geographic region according to the substantially real-time updates.

Figure 3:
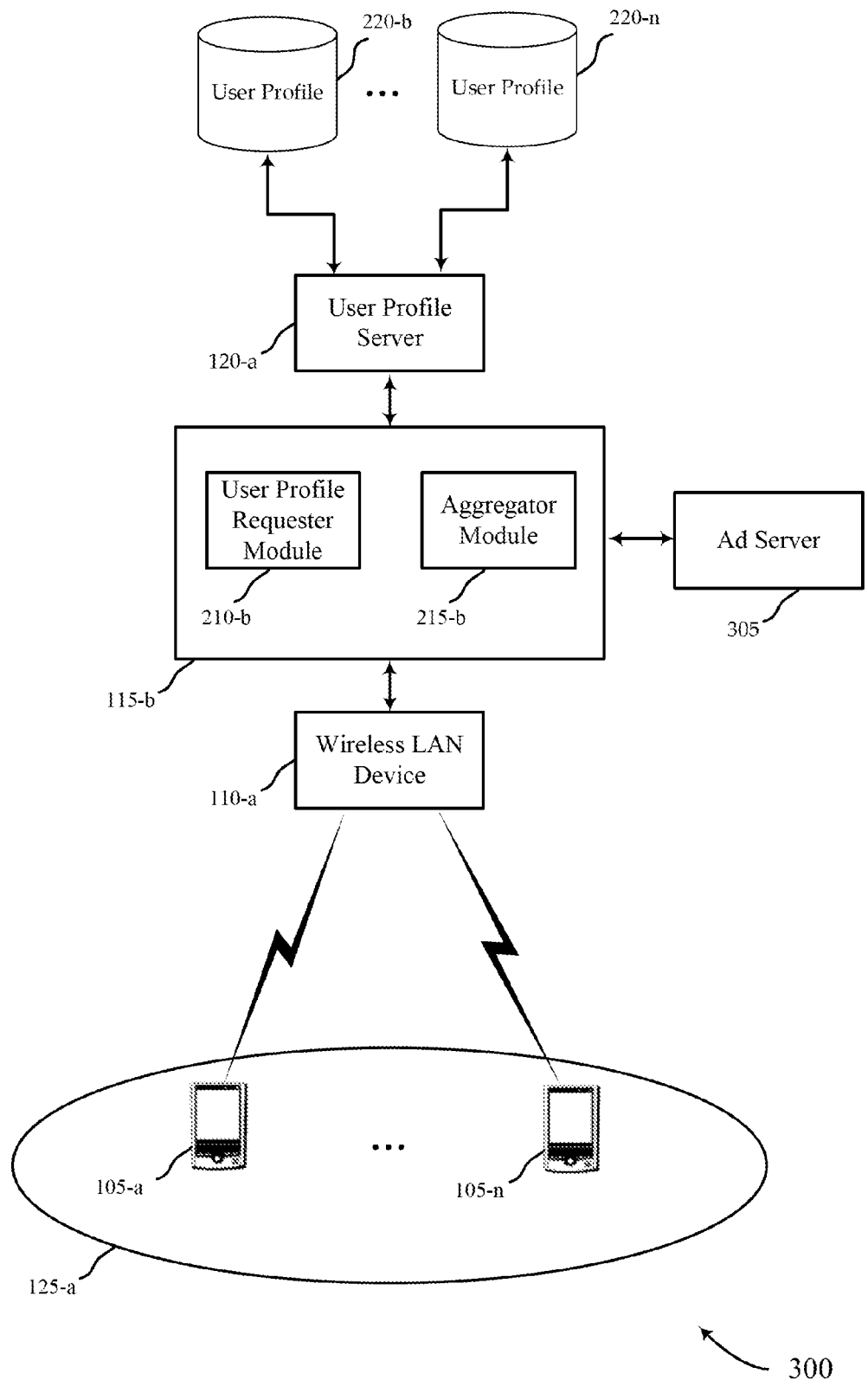
FIG. 3 is a block diagram of a system for generating an aggregated group profile.

Turning next to FIG. 3, a block diagram illustrates an example of a system 300 configured according to various embodiments. This system 300 may be an example of the system 100 of FIG. 1. The system 300 includes a wireless LAN device 110-*a*, a profile aggregation server 115-*b*, a user profile server 120-*a*, user profile data stores 220, and an ad server 305, which may each be in communication with each other directly or indirectly.

In one embodiment, wireless LAN device 110-*a* is configured to detect ATs 105 in an entertainment venue 125-*a*. The wireless LAN device may detect the presence of users as they join the venue's network. The wireless LAN device 110-*a* may monitor ATs 105 as they enter or leave the entertainment venue 125-*a*, and update a listing of those ATs 105 currently at the entertainment venue 125-*a*.

The wireless LAN device 110-*a* may periodically transmit data specifying the identified ATs 105 in the entertainment venue 125-*a* to the profile aggregation server 115-*b*. This identification may be in the form of a Media Access Control (MAC) address, or other identifier. The transmission may be done on a periodic basis, updating previous transmissions to reflect the current AT 105 users in the entertainment venue 125-*a*. The profile aggregation server 115-*b* may also receive a group profile request to provide an aggregated profile of the AT 105 users in the entertainment venue 125-*a*. The group profile request may be received from the wireless LAN device 110-*a*, the entertainment venue 125-*a*, the ad server 305, or other sources. The group profile request may include specification data identifying the type of user profile information to be aggregated. Thus, the group profile request may specify that only parts of the user profile information available be aggregated. The group profile request, and the data specifying the ATs 105 within the region, may be forwarded to the profile requester module 210-*b* and the aggregator module 215-*b* in the profile aggregation server 115-*b*.

The profile requester module 210-*b* may generate and transmit data to the user profile server 120-*a* requesting a user profile for each of the AT 105 users in the geographic region. The user profile server 120-*a* may look up address data for access to each of the user profiles of the AT 105 users, and transmit the request for each user profile (or parts thereof). The respective addresses for the user profiles may correspond to addresses in distributed user profile data stores 220, that are local to or remote from the user profile server 120. The user profile data stores 220 may be one, or more, relational databases or components of relational databases (e.g., tables), object databases or components of object databases, data grids, spreadsheets, text files, internal software lists, or any other type of data structure suitable for storing data. Thus, it should be appreciated that user profile data stores 220 may each be multiple data storages (of the same or different type), or may share a common data storage with other data stores. The user profile server 120-*a* may query the user profile data stores 220 for information to produce the user profile information.

The user profile server 120-*a* may specify or otherwise search or mine for the type of user profile information requested. Thus, when only a subset of the user profile information will be aggregated, the user profile server 120-*a* may request only a portion of each user profile. In one embodiment, the user profile server 120-*a* specifies, in the requests for each user profile, the type of user profile information to be aggregated, allowing certain user information to be withheld at the user profile data stores 220.

The user profile server 120-*a* may transmit the requested user profile information to the aggregator module 215-*b* in the profile aggregation server 115-*b* for aggregation. The aggregator module 215-*b* may generate an aggregated group profile using the received user profile information. The aggregated group profile may be generated according to the specification data from the group profile request identifying a type of user profile information to be aggregated (e.g., only certain types of information will be aggregated in some embodiments).

The aggregator module 215-*b* may transmit the aggregated group profile to the ad server 305. An advertisement may be selected responsive to the aggregated group profile. As the mix of AT 105 users at a venue change, the user profile requester module 210-*b* may generate and transmit data requesting new user profiles to the user profile server 120-*a*. Once the new user profile information is retrieved, an updated aggregate group profile may be generated by the aggregator module 215-*b* according the current AT 105 users. The selection or recommendation of advertisements may change responsive to the updated aggregated group profile.

Consider an example of a movie theater. A theater operator, in conjunction with the advertiser or service provider, may dynamically use the aggregated profile and context of the movie to target the group with services or advertisements. For instance, if the common profile indicates that a majority of the patrons present have an interest in running and the movie is a comedy, the ad server 305 may pull an ad for Nike running shoes that have a comedic theme. If the movie is a romance, then the ad server 305 may pull a romantic-themed ad for running shoes. As more users enter or leave the theater, the aggregated group profile may be updated by new calls to the user profile server 120-*a*. Any metrics as to what ad that was played where and what profile was sent can be fed back to the profile aggregation server 115-*b* and data mined for additional information.

Figure 4:
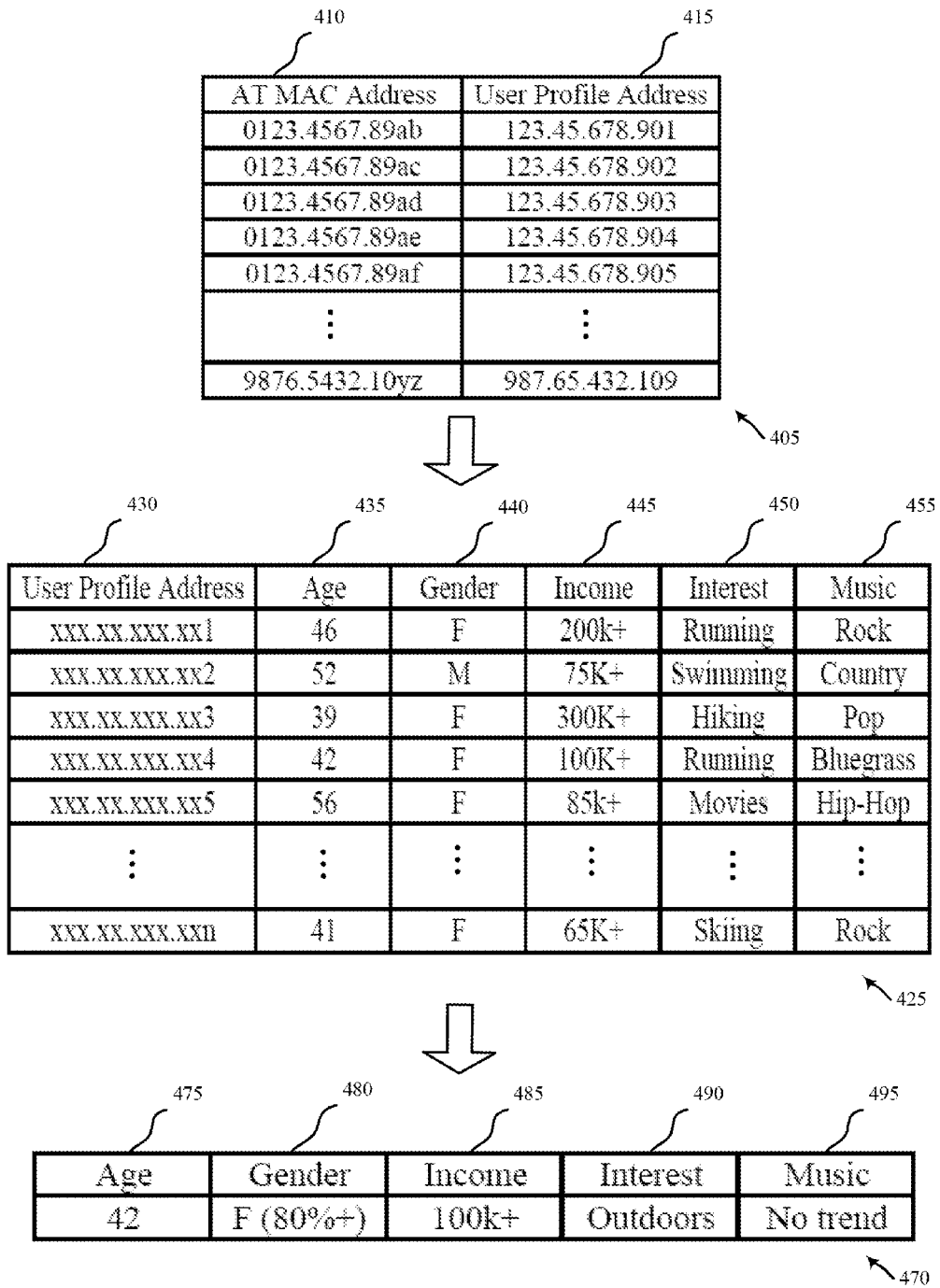
FIG. 4 is an example of tables that may be used to generate an aggregated group profile.

FIG. 4 illustrates a series of tables 400 that may be used to generate an aggregated group profile according to various embodiments. FIG. 4 includes a first table 405 which may be used to look up addresses for user profile information associated with ATs. This table may be stored in the location server 110, profile aggregation server 115, or the user profile server 120 of FIG. 1, 2, or 3, and used to match AT identifiers (in this case, MAC addresses) with particular user profiles. The table includes a first column 410 for MAC addresses, and a second column 415 for user profile addresses. Once an identification of the ATs located within a particular table is made, addresses for the associated user profiles may be found using the table 405 (it is worth noting that this table is for purposes of example only, as many other data structures and look-up tables may be used in other embodiments).

Once a user profile address in column 415 has been located, a request may be sent to the local or remote storage devices at this address for particular user profile information. In one embodiment, the entire user profile is requested and retrieved for aggregation. In other embodiments, group profile requests may include specification data identifying certain types of data to be aggregated.

In the illustrated embodiment, assume that the group profile request specifies that the group profile aggregation should include only age, gender, income, interests, and music categories. In the illustrated example, this specific information (age, gender, income, interests, and music categories) may be requested (e.g., from the user profile data stores 220 of FIG. 3). A second table 425 illustrates the user profile information that is retrieved in this example. The table includes columns illustrating the user profile addresses 430 for the identified ATs in a particular region, and includes columns further identifying the age 435, gender 440, income 445, interests 450, and music tastes 455 of each respective user. This table 425 may be stored, for example, in the profile aggregation server 115 of FIG. 1, 2, or 3.

The information in the second table 425 may be processed (e.g., by the profile aggregation server 115) to generate an aggregated group profile. An example of an aggregated group profile is illustrated in the third table 470 of FIG. 4. This table 470 illustrates the average age 475, gender composition 480, median income level 485, interests 490, and music tastes 495 for the ATs of a certain geographic region. This single, non user-identifying profile aggregation may be transmitted (e.g., to a subscribing venue or ad server). This table further illustrates how different averaging and aggregation techniques (e.g., averages, percentages, trends, and other characterization techniques) may be used to generate the aggregated group profile. Again, it is worth noting that this table is for purposes of example only, and many other data structures and look-up tables may be used in other embodiments.

Figure 5:
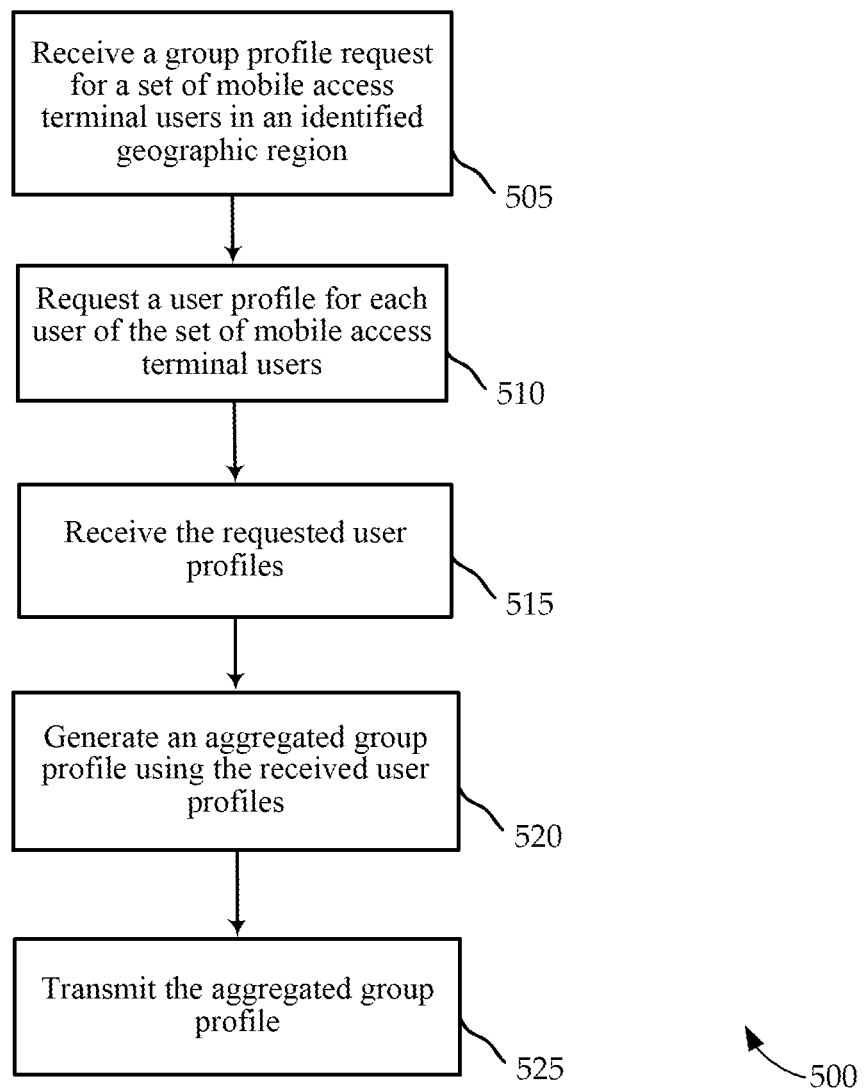
FIG. 5 is a flowchart illustrating a method of group profile aggregation.

FIG. 5 is a flowchart illustrating a method 500 for group profile aggregation according to various embodiments. The method 500 may be performed, for example, in whole or in part, by the profile aggregation server 115 described with reference to FIG. 1, 2, or 3. One or more steps may be performed by a location server 110 or user profile server 120 described with reference to FIG. 1 or 3.

At stage 505, a group profile request is received for a set of mobile access terminal users in an identified geographic region. At stage 510, a user profile is requested for each of the set of mobile access terminal users. At stage 515, the requested user profiles are received. At stage 520, an aggregated group profile is generated using the received user profiles. At stage 525, the aggregated group profile is transmitted.

Figure 6:
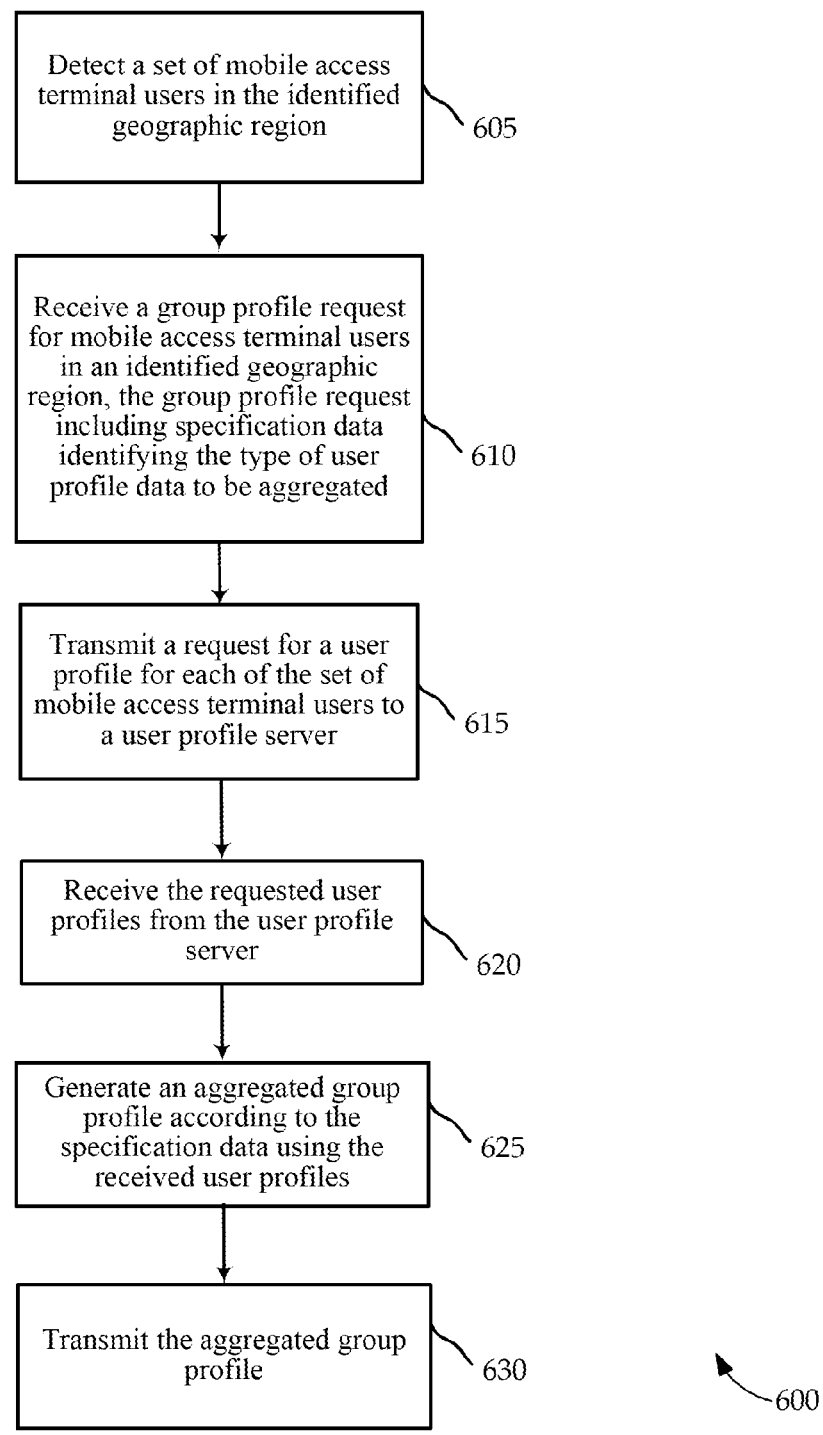
FIG. 6 is a flowchart illustrating a method of group profile aggregation using specification data.

FIG. 6 is a flowchart illustrating a method 600 for group profile aggregation using specification data according to various embodiments. The method 600 may be performed, for example, in whole or in part, by the profile aggregation server 115 described with reference to FIG. 1, 2, or 3. One or more steps may be performed by a location server 110 or user profile server 120 described with reference to FIG. 1 or 3.

At stage 605, a set of mobile access terminal users is detected in the identified geographic region. At stage 610, a group profile request is received for mobile access terminal users in an identified geographic region, the group profile request including specification data identifying the type of user profile data to be aggregated. At stage 615, a request for a user profile for each of the set of mobile access terminal users is transmitted to a user profile server. At stage 620, the requested user profiles are received from the user profile server. At stage 625, an aggregated group profile is generated according to the specification data using the received user profiles. At stage 630, the aggregated group profile is transmitted.

Figure 7:
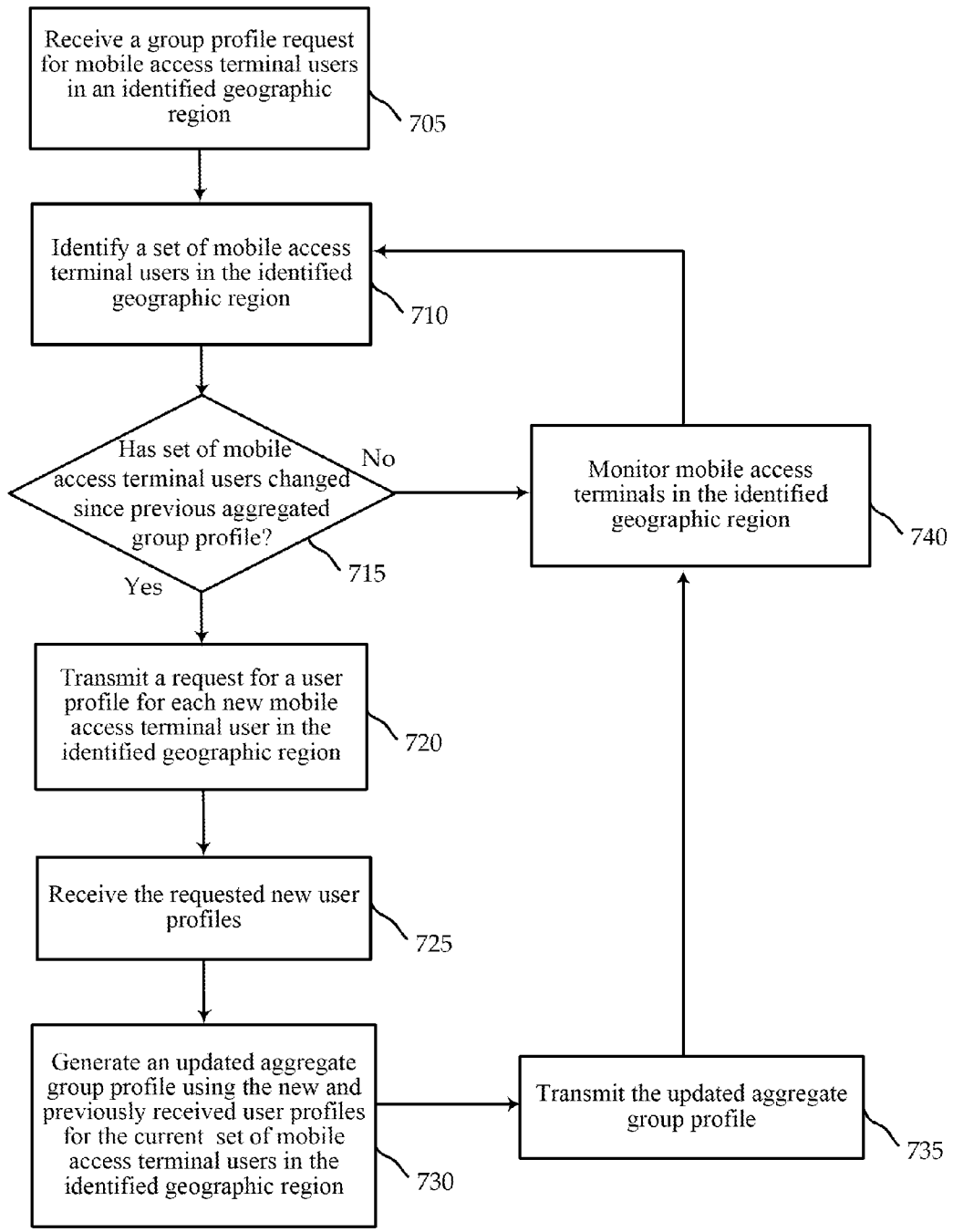
FIG. 7 is a flowchart illustrating a method of generating updated aggregate group profiles.

FIG. 7 is a flowchart illustrating a method 700 for generating updated aggregate group profiles according to various embodiments. The method 700 may be performed, for example, in whole or in part, by the profile aggregation server 115 described with reference to FIG. 1, 2, or 3. One or more steps may be performed by a location server 110 or user profile server 120 described with reference to FIG. 1 or 3.

At stage 705, a group profile request is received for mobile access terminal users in an identified geographic region. At stage 710, a set of mobile access terminal users in the geographic region is identified. This may be an updated identification, for example, received from a location based service or provided by a group profile requester.

At stage 715, a determination is made whether the set of mobile access terminal users has changed since a previous aggregated group profile. At stage 720, if the set of mobile access terminal users has changed since the previous aggregated group profile, a request for a user profile for each new mobile access terminal user in the identified geographic region is transmitted. This may be a transmission to a user profile server. At stage 725, the requested new user profiles are received (e.g., from the user profile server).

At stage 730, an updated aggregate group profile is generated using the new and previously received user profiles for the current set of mobile access terminal users in the identified geographic region. At stage 735, the updated aggregate group profile is transmitted (e.g., to a subscribing venue requesting the aggregated group profile, or to an ad server).

At stage 740, the mobile access terminals in the identified geographic region are monitored (e.g., using a location based service). This monitoring at stage 740 may also occur when the determination at stage 715 is that the set of mobile access terminal users has not changed since the previous aggregated group profile. From the monitoring at stage 740, the method returns to stages 710-735 (e.g., after defined periods), for further group profile updating, as needed.

Figure 8:
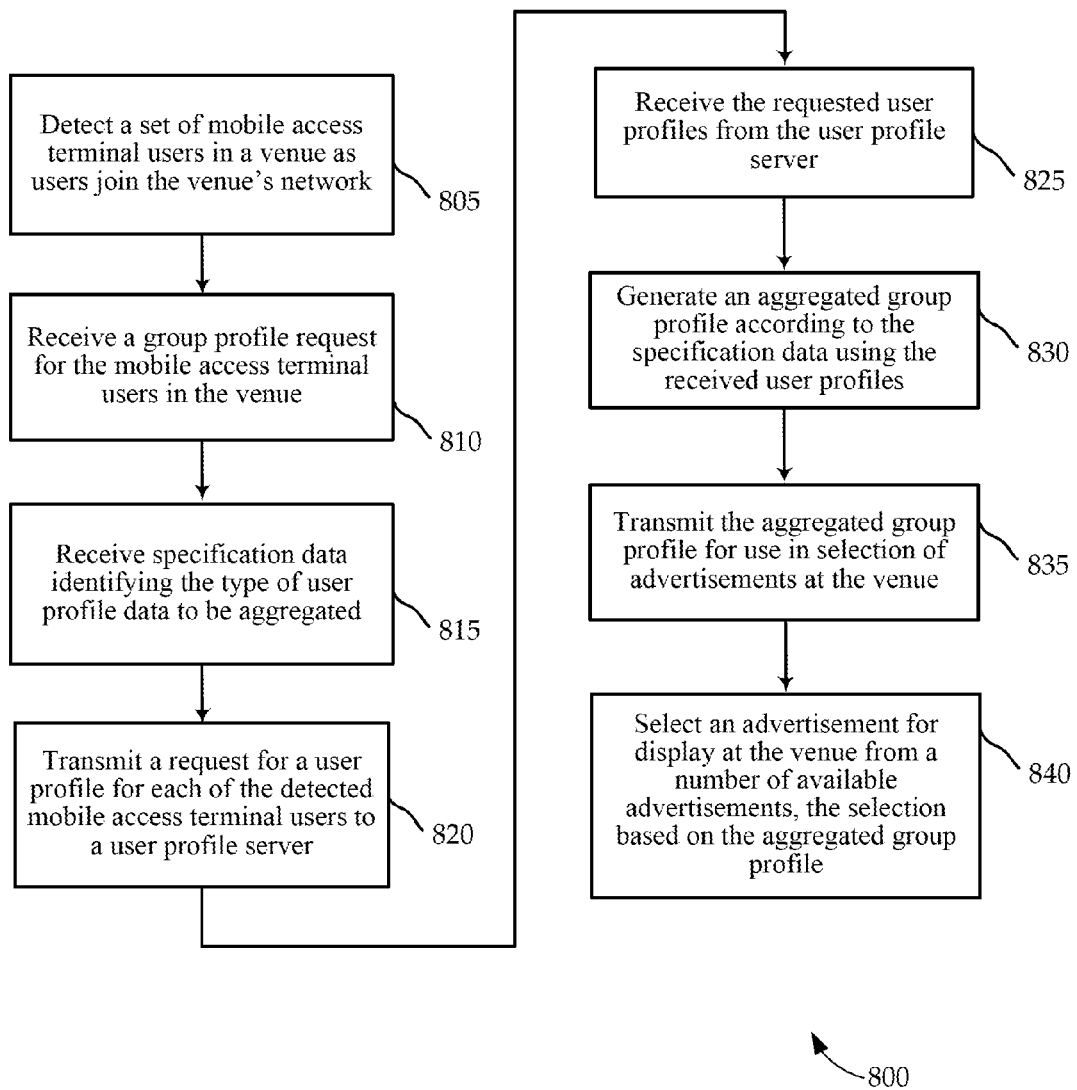
FIG. 8 is a flowchart illustrating a method for generating aggregate group profiles for a venue.

FIG. 8 is a flowchart illustrating a method 800 for generating aggregate group profiles for a venue according to various embodiments. The method 800 may be performed, for example, in whole or in part, by the profile aggregation server 115 described with reference to FIG. 1, 2, or 3. One or more steps may be performed by a location server 110 or user profile server 120 described with reference to FIG. 1 or 3.

At stage 805, a set of mobile access terminal users in a venue is detected as users join the venue's network. At stage 810, a group profile request is received for the mobile access terminal users in the venue. At stage 815, specification data identifying the type of user profile data to be aggregated is received.

At stage 820, a request for a user profile for each of the detected mobile access terminal users is transmitted to a user profile server. At stage 825, the requested user profiles are received from the user profile server. At stage 830, an aggregated group profile is generated according to the specification data using the received user profiles. At stage 835, the aggregated group profile is transmitted for use in the selection of advertisements at the venue. At stage 840, an advertisement is selected for display at the venue from a number of available advertisements, the selection based on the aggregated group profile.

It is worth noting that there are a number of ways in which aspects of the foregoing technologies may be used. Merely by way of example, pre-show advertisements at a theater may be targeted based on who is in the audience and in context to the type of movie. Services at stadiums may be directed to areas where interest is concentrated. Entertainment and advertising at airport lounges and waiting areas may be targeted at a captured audience. The music playlist at restaurants or nightclubs may be targeted based on the audience's playlists or musical interests. Ads to digital billboards may be targeted based on who is stuck in traffic around the billboard. Ads to digital billboards at a bus stop may be targeted based on who is there. Ads may be targeted in malls based on the current composition of shoppers. Theme parks, concert venues, conferences, and conventions may target ads or services to attendees.

Considerations Regarding the Description

The various illustrative blocks, servers, and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

Techniques described herein may be used with various wireless communication systems and access terminals, such as CDMA, TDMA, FDMA, OFDMA, SC-FDMA, and other systems. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.15.1 (Bluetooth), IEEE 802.15.4 (Zigbee), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, such as those in peer-to-peer and ad-hoc networks.

Throughout this disclosure the term "exemplary" indicates one example or one instance and does not imply or require any preference for the noted example. The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method for group profile generation, the method comprising:
    receiving a group profile request for a plurality of current mobile access terminal users in an identified geographic region;
    transmitting a request for a user profile for each of the plurality of current mobile access terminal users;
    receiving a plurality of user profiles in response to the transmitted request, each of the plurality of user profiles comprising user information for one or more pre-defined categories;
    generating a single group profile reflective of the plurality of current mobile access terminal users, the single group profile including non-user-identifying information for the one or more pre-defined categories processed from the received plurality of user profiles for the plurality of current mobile access terminal users in the identified geographic region, wherein generating the single group profile includes generating a single value, for each of the one or more pre-defined categories, from the user information in the received plurality of user profiles for the respective each of the one or more pre-defined categories; and
    transmitting to an ad server the single group profile reflective of the plurality of current mobile access terminal users for use in selection of one or more appropriate advertisements from a plurality of available advertisements, based on the single value for each of the one or more pre-defined categories in the single group profile generated from the plurality of user profiles for each of the plurality of current mobile access terminal users in the identified geographic region, the one or more appropriate advertisements to be transmitted to each mobile terminal of the plurality of current mobile access terminal users in the identified geographic region.

2. The method of claim 1, further comprising detecting the plurality of current mobile access terminal users in the identified geographic region.

3. The method of claim 2, wherein the detecting comprises identifying, within the identified geographic region, mobile access terminal users subscribed to a service with access to respective user profiles for group profile aggregation.

4. The method of claim 1, wherein transmitting the request comprises:
    looking up address data for access to each of the plurality of user profiles for the plurality of current mobile access terminal users; and
    transmitting the request for the user profile for each of the plurality of current mobile access terminal users to respective addresses.

5. The method of claim 4, wherein at least a subset of the respective addresses are associated with storage devices geographically remote from each other.

6. The method of claim 1, further comprising receiving specification data identifying a type of user profile information to be aggregated, wherein the single group profile is generated according to the specification data.

7. The method of claim 6, wherein the request for the user profile for each mobile access terminal user comprises a type request for only the type of user profile information to be aggregated; and
    wherein receiving the plurality of user profiles comprises receiving only the type of user profile information to be aggregated.

8. The method of claim 1, further comprising:
    receiving identification of additional mobile access terminal users entering the identified geographic region;
    transmitting an additional request for user profiles of the additional mobile access terminal users;
    receiving a plurality of additional user profiles for the additional mobile access terminal users; and
    generating an updated group profile using the received plurality of additional user profiles.

9. The method of claim 8 further comprising dynamically changing selection from a first advertisement of the plurality of available advertisements to a second advertisement of the plurality of available advertisements responsive to individual values for each of the one or more pre-defined categories in the updated group profile.

10. The method of claim 1 further comprising receiving data input by a first mobile access terminal user to generate a first user profile for the first mobile access terminal user.

11. The method of claim 1 further comprising monitoring use of a first mobile access terminal by a first mobile access terminal user to generate a first user profile for the first mobile access terminal user.

12. The method of claim 1 wherein the user profile comprises at least one of data identifying age, gender, income, or residence address.

13. The method of claim 1, wherein the group profile request and identification of the plurality of current mobile access terminal users in the identified geographic region are received from an entertainment venue; and wherein the single group profile is transmitted to the entertainment venue.

14. The method of claim 1, wherein generating the single group profile that includes non-user-identifying information processed from the received plurality of user profiles comprises:
averaging at least some of the information of the received plurality of user profiles.

15. An apparatus for group profile generation, the apparatus comprising:
means for receiving a group profile request for a plurality of current mobile access terminal users in an identified geographic region;
means for transmitting a request for a user profile for each of the plurality of mobile access terminal users;
means for receiving a plurality of user profiles in response to the transmitted request, each of the plurality of user profiles comprising user information for one or more pre-defined categories;
means for generating a single group profile reflective of the plurality of current mobile access terminal users, the single group profile including non-user-identifying information for the one or more pre-defined categories processed from the received plurality of user profiles for the plurality of current mobile access terminal users in the identified geographic region, wherein the means for generating the single group profile includes means for generating a single value, for each of the one or more pre-defined categories, from the user information in the received plurality of user profiles for the respective each of the one or more pre-defined categories; and
means for transmitting to an ad server the single group profile reflective of the plurality of current mobile access terminal users for use in selection of one or more appropriate advertisements from a plurality of available advertisements, based on the single value for each of the one or more pre-defined categories in the single group profile generated from the plurality of user profiles for each of the plurality of current mobile access terminal users in the identified geographic region, the one or more appropriate advertisements to be transmitted to each mobile terminal of the plurality of current mobile access terminal users in the identified geographic region.

16. The apparatus of claim 15 further comprising means for identifying the plurality of current mobile access terminal users in the identified geographic region.

17. The apparatus of claim 15 further comprising means for receiving an identification of the plurality of current mobile access terminal users in the identified geographic region.

18. The apparatus of claim 15 wherein the means for transmitting the request comprises:
means for looking up address data for access to each of the plurality of user profiles of the plurality of current mobile access terminal users; and
means for transmitting the request for the user profile for each of the plurality of current mobile access terminal users to the respective addresses.

19. The apparatus of claim 18 wherein at least a subset of the respective addresses resides on a storage device local to the apparatus.

20. The apparatus of claim 15 wherein the means for generating comprises means for generating the single group profile according to specification data identifying a type of user profile information to be aggregated.

21. An apparatus for group profile generation, the apparatus comprising:
a network interface configured to:
receive a group profile request for a plurality of current mobile access terminal users each detected in an identified geographic region; and
transmit to an ad server a single group profile reflective of the plurality of current mobile access terminal users for use in selection of one or more appropriate advertisements from a plurality of available advertisements, based on the single group profile, the one or more appropriate advertisements to be transmitted to each mobile terminal of the plurality of current mobile access terminal users in the identified geographic region;
a profile requester, communicatively coupled with the network interface, and configured to request a user profile for each of the plurality of current mobile access terminal users; and
an aggregator configured to:
receive a plurality of user profiles, each of the plurality of user profiles comprising user information for one or more pre-defined categories; and
generate the single group profile reflective of the plurality of current mobile access terminal users, the single group profile including non-user-identifying information for the one or more pre-defined categories processed from the received plurality of user profiles for the plurality of current mobile access terminal users in the identified geographic region, wherein generating the single group profile includes generating a single value, for each of the one or more pre-defined categories, from the user information in the received plurality of user profiles for the respective each of the one or more pre-defined categories the single value being used to select or more appropriate advertisements.

22. The apparatus of claim 21 wherein the aggregator is further configured to receive specification data identifying one or more types of user profile information to be aggregated, wherein the single group profile is generated according to the specification data.

23. The apparatus of claim 21 wherein the network interface is further configured to receive substantially real-time updates on mobile access terminal users entering and leaving the identified geographic region.

24. The apparatus of claim 23 wherein the aggregator is configured to generate the single group profile using user profiles of the mobile access terminal users in the identified geographic region according to the substantially real-time updates.

25. A computer program product residing on a non-transitory processor-readable medium and comprising processor-readable instructions configured to cause a processor to:
  receive a group profile request for a plurality of current mobile access terminal users in an identified geographic region;
  transmit a request for a user profile for each of the plurality of current mobile access terminal users;
  receive a plurality of user profiles in response to the transmitted request, each of the plurality of user profiles comprising user information for one or more pre-defined categories;
  generate a single group profile reflective of the plurality of current mobile access terminal users, the single group profile including non-user-identifying information for the one or more pre-defined categories processed from the received plurality of user profiles for the plurality of current mobile access terminal users in the identified geographic region, wherein generating the single group profile includes generating a single value, for each of the one or more pre-defined categories, from the user information in the received plurality of user profiles for the respective each of the one or more pre-defined categories; and
  transmit to an ad server the single group profile reflective of the plurality of current mobile access terminal users for use in selection of one or more appropriate advertisements from a plurality of available advertisements, based on the single value for each of the one or more pre-defined categories in the single group profile generated from the plurality of user profiles for each of the plurality of current mobile access terminal users in the identified geographic region, the one or more appropriate advertisements to be transmitted to each mobile terminal of the plurality of current mobile access terminal users in the identified geographic region.

26. The computer program product of claim 25 further comprising processor-readable instructions configured to cause the processor to identify, within the identified geographic region, mobile access terminal users subscribed to a service with access to respective user profiles for group profile aggregation.

27. The computer program product of claim 25 wherein the processor-readable instructions configured to cause the processor to transmit the request comprise instructions to:
  look up address data for access to each of the plurality of user profiles for the plurality of current mobile access terminal users; and
  transmit the request for the user profile for each of the plurality of current mobile access terminal users to respective addresses.

28. A system for group profile generation, the system comprising:
  a location server configured to identify a plurality of current mobile access terminal users in an identified geographic region;
  a user profile server configured to store user profiles for each of the plurality of current mobile access terminal users; and
  a profile aggregation server, in communication with the location server and the user profile server, and configured to:
    receive a group profile request and identification of the plurality of current mobile access terminal users;
    transmit a request for at least a part of the user profiles for each of the plurality of current mobile access terminal users to the user profile server;
    receive a plurality of user profiles in response to the transmitted request, each of the plurality of user profiles comprising user information for one or more pre-defined categories;
    generate a single group profile reflective of the plurality of current mobile access terminal users, the single group profile including non-user-identifying information for the one or more pre-defined categories processed from the received plurality of user profiles for the plurality of current mobile access terminal users in the identified geographic region, wherein generating the single group profile includes generating a single value, for each of the one or more pre-defined categories, from the user information in the received plurality of user profiles for the respective each of the one or more pre-defined categories; and
    transmit to an ad server the single group profile reflective of the plurality of current mobile access terminal users for use in selection of one or more appropriate advertisements from a plurality of available advertisements, based on the single value for each of the one or more pre-defined categories in the single group profile generated from the plurality of user profiles for each of the plurality of current mobile access terminal users in the identified geographic region, the one or more appropriate advertisements to be transmitted to each mobile terminal of the plurality of current mobile access terminal users in the identified geographic region.

29. The system of claim 28 wherein the location server comprises a network for an entertainment venue, and the location server identifies the plurality of current mobile access terminal users in the identified geographic region when the plurality of current mobile access terminal users join the network.

30. The system of claim 28 wherein the location server identifies the plurality of current mobile access terminal users in the identified geographic region by receiving notification from a location based service provider.

31. The system of claim 28 wherein the location server is further configured to:
  monitor mobile access terminal users in the identified geographic region; and
  transmit periodic updates to the profile aggregation server, the periodic updates identifying the mobile access terminal users in the identified geographic region.

32. The system of claim 31 wherein the profile aggregation server is further configured to generate updated group profiles using the periodic updates.

33. The system of claim 28 wherein the user profile server is further configured to:
  look up locally stored address data for each of the plurality of user profiles for the plurality of current mobile access terminal users; and
  transmit requests for the at least part of the user profiles for each of the plurality of current mobile access terminal users to respective addresses.

34. The system of claim 33 wherein the user profile server is further configured to:
  specify, in the requests, a type of user profile information to be aggregated; and
  provide the type of user profile information to be aggregated to the profile aggregation server, wherein at least a subset of the user profile information is withheld from the profile aggregation server.

35. The system of claim 28 wherein the profile aggregation server is further configured to receive specification data identifying a type of user profile information to be aggregated, wherein the single group profile is generated according to the specification data.

36. The system of claim 35 wherein, the specification data is selected by an entertainment venue, and the profile aggregation server is configured to transmit the single group profile to the entertainment venue.

* * * * *